Feb. 13, 1923.
E. W. TEST.
CAR DOOR.
FILED OCT. 22, 1919.
1,444,987.
3 SHEETS—SHEET 2.
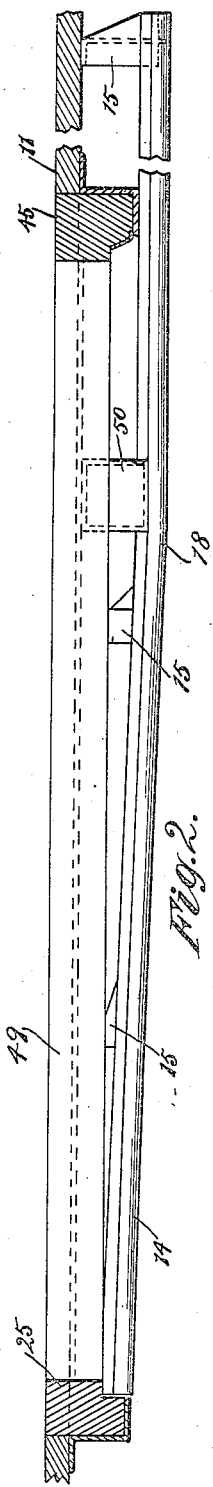
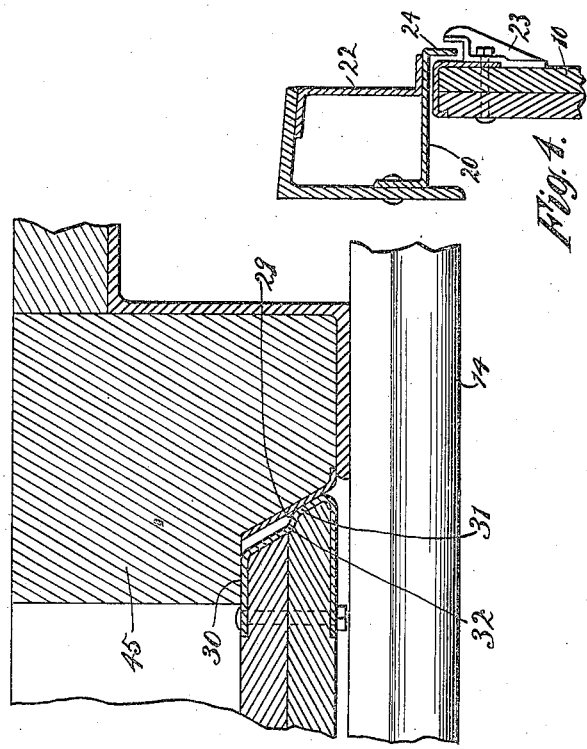
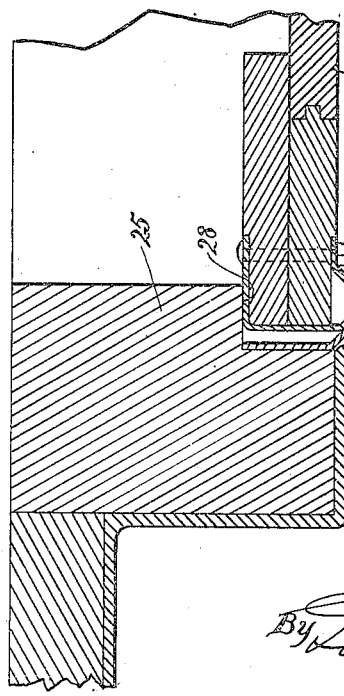
Inventor:
Ellis W. Test
By
Attys.

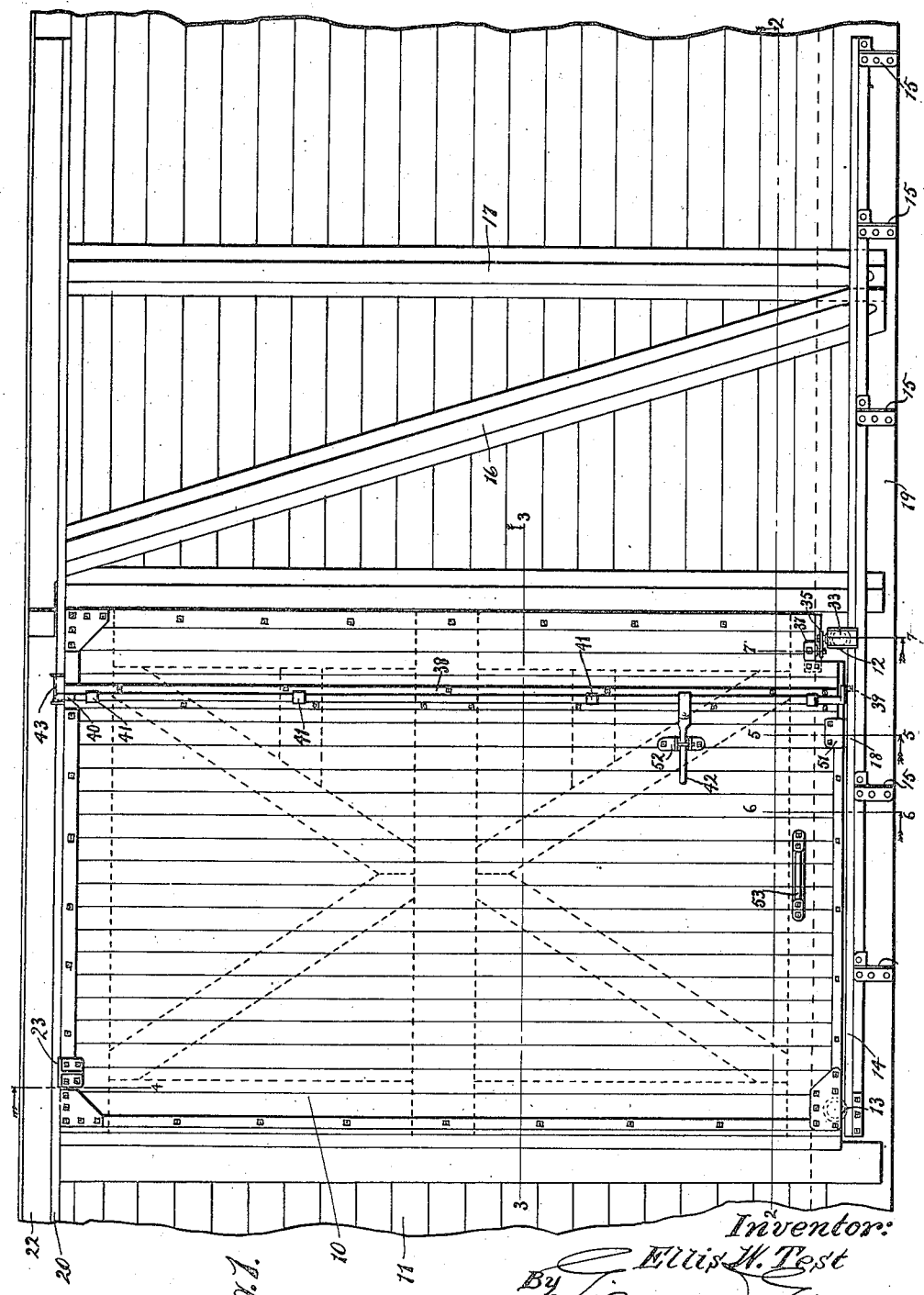

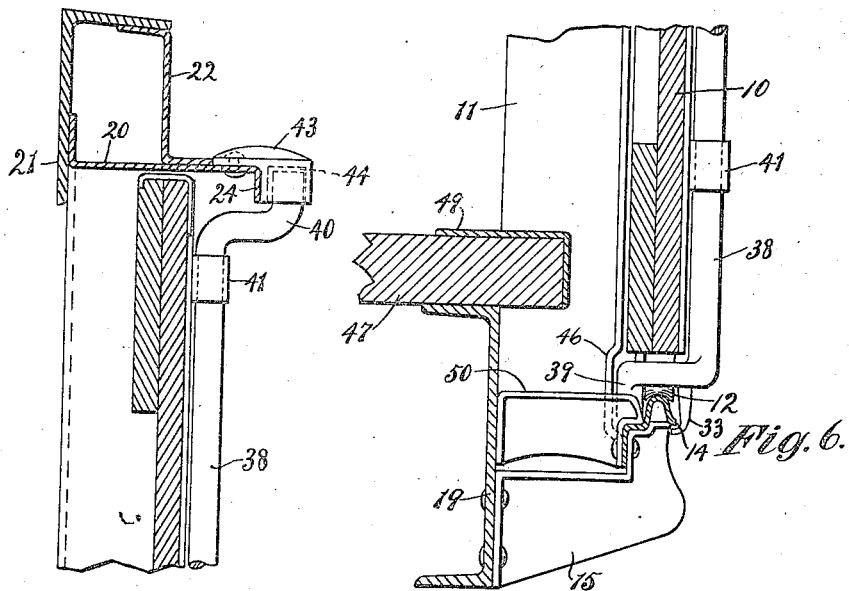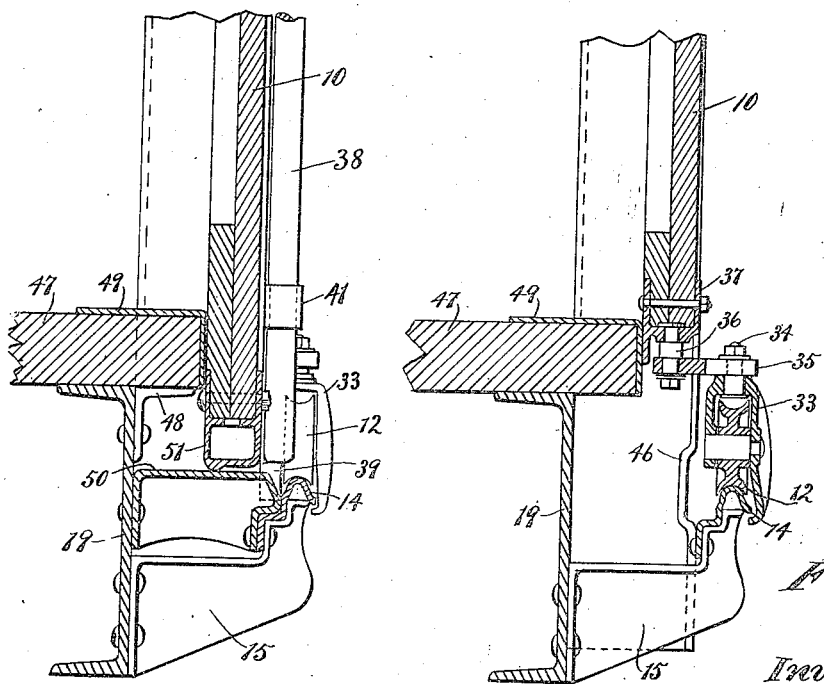

Patented Feb. 13, 1923.

1,444,987

UNITED STATES PATENT OFFICE.

ELLIS W. TEST, OF MICHIGAN CITY, INDIANA, ASSIGNOR TO THE PULLMAN COMPANY, OF CHICAGO, ILLINOIS, A CORPORATION OF ILLINOIS.

CAR DOOR.

Application filed October 22, 1919. Serial No. 332,466.

*To all whom it may concern:*

Be it known that I, ELLIS W. TEST, a citizen of the United States, and resident of Michigan City, county of Laporte, and State of Indiana, have invented certain new and useful Improvements in Car Doors, of which the following is a specification, and which are illustrated in the accompanying drawings, forming a part thereof.
This invention relates to car doors, and has for an object the provision of a door that when closed will form a tight joint with the door opening; a door that may be readily opened without sticking, and which may be readily and effectively locked.

An illustrative embodiment of the invention is shown in the accompanying drawings, in which—

Fig. 1 is a side elevation of a door and a portion of a car to which the door is shown as applied;

Fig. 2 is a horizontal section on line 2—2 of Fig. 1, the door being omitted;

Fig. 3 is a horizontal section, on an enlarged scale, on line 3—3 of Fig. 1, a part broken out and the door jambs moved toward each other to save space;

Figs. 4, 5, 6 and 7 are detail vertical sections to various scales, on the corresponding section lines of Fig. 1,—Fig 6 showing the door in a different position from that of the other figures.

The invention is shown as applied to a roller door having the track at the bottom of the door. With obvious changes the same invention might be applied to an overhead track door, or to a door which merely slides without rollers.

A door 10 is shown as mounted on the side of a box car 11, by being supported upon rollers 12, 13, traveling on a track 14. The track 14 may be supported upon brackets, as 15, spaced away from the side of the car sufficiently so that the door may clear the brace 16 and post 17, but approaching near the side of the car at the door opening from a point, as 18 (see Fig. 2), for a purpose to be explained. The brackets 15 are shown as secured directly to a sill, as 19, of the car.

The top of the door is shown as protected from the weather and guided in its movement by a lintel, as 20, which is shown as a Z-bar secured to a plate, as 21, of the car, and braced by a second Z-bar, as 22. To maintain the position of the front edge of the door relative to the lintel 20 a bracket is shown at 23. The spacing of the depending edge 24 of the lintel 20 from the car body varies in the same manner as does the spacing of track 14, as indicated by a comparison of Figs. 4 and 5.

To make a tight joint with the door the post 25 at the front edge of the door is provided with a weather strip, as 26, and the edge of the door with a metal member 27 to coact therewith. When the front edge of the door is guided by track 14 and lintel 20 toward the car body as it approaches a closed position, the member 27 will have a wedging action with strip 26 which will force the door tightly against the face 28 of the rabbet of the door post.

The post at the rear of the door is shown as provided with a rabbet having a face 29 preferably shod with metal, as shown, which face is at an obtuse angle to the inner face 30 of the rabbet. To coact with the slanting face 29 the rear edge of the door is formed at a corresponding angle and is preferably also metal covered, as by member 31. To reduce friction member 31 may be formed with an offset 32 in order that the edge of the door may contact with the door post through but a portion of its thickness.

To permit the rear edge of the door to be moved laterally in order to withdraw the same from the rabbet 29, 30, of the door post, the form of roller shown at 12 is preferred. This roller is shown as comprising a caster wheel housing 33, having the roller 12 journaled therein, and a vertical pin 34 projecting from its upper portion. A link 35 is shown pivoted at one end on pin 34 and at the other end on a pin 36, shown as secured in a clip 37 bolted to the lower edge of the door.

For the purpose of moving the rear edge of the door laterally or in a plane perpendicular to the car body, a shaft 38, having crank ends 39, 40, is shown as mounted in loops 41 secured to the door, in which loops the shaft may turn upon its axis. To turn the shaft 38 on its axis a lever 42 may be provided securely fastened thereto. The crank ends 39 and 40 of the shaft 38 are shown as placed at an angle of substantially 90° from each other. To coact with the crank end 40 in control of the door a member 43 is shown attached to the lintel, which member provides a channel at 44 into which the crank end slides when the door is moved from open to closed position.

With the door closed as shown in all figures except Figs. 2 and 6, if the handle 42 be turned to a position perpendicular to the door the crank end 40 will exert a pull upon the door and lintel to move the rear edge of the door away from the rabbet to a position as shown in Fig. 6, the link 35 turning upon pivots 34 and 36. In this position the door may be opened, sliding clear of the post 45. The face of the post is shown notched at 46 (Fig. 6) to allow clearance for crank end 39. The front edge of the door will be guided by the form of the track 18 and lintel 20, 24, so as to also clear the post 45.

When the door is moved to a closed position the front edge of the door will be guided by the track and lintel so that the member 27 will engage strip 26 as above explained, the momentum of the door causing a snug fit against face 28 of the rabbet. At the same time crank end 40 will enter channel 44. If the lever 42 be now turned to the position of Fig. 1, crank end 39 will press against track 14 and crank end 40 against the outer side of the channel 44, and the door will be forced toward the car. Coaction of beveled surfaces 29 and 31 will insure a tight fit at the rear edge of the door, and will, moreover, tend to force the door into the channel formed by weather strip 26 and the rabbet face 28.

To make a tight joint at the bottom of the door the floor 47 is shown as projected beyond the sill 19 and may be supported by brackets, as 48, and protected by a wear plate, as 49.

To take the weight of the door, when it is closed and the car is in use, off from the link 35 and pivots 34 and 36, a plate, as 50, may be secured to the track 18 and to the sill 19, and a member 51 may be bolted to the bottom of the door, which member will ride up upon plate 50 when the door is rolled shut, and may slide laterally thereon when the rear edge of the door is forced toward the post 45.

To lock the door shut it is only necessary to lock the lever 42 to prevent its movement. This may be accomplished by passing a locking, and if desired a sealing, member through the brackets 52 shown as standing at each side of the lever when the door is fully closed. A handle for use in sliding the door is shown at 53.

I claim as my invention—

1. In a car door, in combination, a door, a track at the bottom of said door, a caster wheel adapted to run upon said track, a link having pivotal connection with said caster wheel and to said door adjacent its rear edge whereby said edge may be moved in a direction perpendicular to the side of the car, a vertical shaft mounted on the door for rotation on its axis, a crank at each end of the shaft, a member on the door lintel provided for coaction with one crank, the other crank coacting with the track, whereby upon rotation of the shaft the rear edge of the door will be moved toward or away from the car body, and a horizontal supporting plate on which the lower edge of the door is adapted to slide laterally as said rear edge is moved toward or away from the car body.

2. In combination, a car door, a track upon which said door is adapted to slide, said track being nearest the car body at its end adjacent the front edge of the closed door whereby the front edge of the door will be moved laterally toward the car upon closing, a vertical shaft mounted upon the door for rotation on its axis, a crank at each end of the shaft, a member on the door lintel providing for coaction with one crank, the other crank coacting with the track, whereby upon rotation of the shaft the rear edge of the door will be moved toward or away from the car body, and a supporting plate on which the lower edge of the door is adapted to slide laterally as said rear edge is moved toward or away from the car body.

ELLIS W. TEST.